(12) United States Patent
Ucero

(10) Patent No.: US 8,138,430 B1
(45) Date of Patent: Mar. 20, 2012

(54) WINDOW POWER DISTRIBUTION PANEL FOR EXTERIOR GENERATOR

(76) Inventor: Jose Ucero, Oklahoma City, OK (US)

( * ) Notice: Subject to any disclaimer, the term of this patent is extended or adjusted under 35 U.S.C. 154(b) by 496 days.

(21) Appl. No.: 12/459,047

(22) Filed: Jun. 27, 2009

(51) Int. Cl.
*H02B 1/40* (2006.01)

(52) U.S. Cl. ......... 174/480; 174/481; 174/494; 220/3.3; 220/4.02

(58) Field of Classification Search ............ 174/50, 174/53, 57, 480, 481, 494, 59; 220/3.2–3.9, 220/4.02; 248/906, 200, 343; 439/535, 536, 439/538, 76.1, 574, 214–216, 502
See application file for complete search history.

(56) References Cited

U.S. PATENT DOCUMENTS

| | | | |
|---|---|---|---|
| 4,798,082 A | 1/1989 | Fujikawa | |
| D344,067 S | 2/1994 | Krohaugger | |
| 6,184,461 B1 | 2/2001 | Flegel | |
| 6,280,211 B1 | 8/2001 | Tateishi | |
| 6,369,321 B1 | 4/2002 | Flegel | |
| 6,504,268 B1 * | 1/2003 | Flegel | 174/59 |
| 6,541,718 B2 | 4/2003 | Burkholder | |
| 6,801,425 B2 | 10/2004 | Buck | |
| 6,805,579 B2 * | 10/2004 | Marchand et al. | 439/502 |
| 7,053,497 B2 | 5/2006 | Sodemann | |
| 7,224,578 B2 | 5/2007 | Buck | |
| D546,761 S | 7/2007 | Schnackenberg | |
| 7,365,964 B2 * | 4/2008 | Donahue, IV | 174/50 |

* cited by examiner

*Primary Examiner* — Angel R Estrada
(74) *Attorney, Agent, or Firm* — Randal D. Homburg

(57) ABSTRACT

An outdoor generator accessory comprising a window power strip, the power strip defining an encasement having a lower margin set within a window seat of a residence or commercial building, and upper margin sealed against a lower window panel, in inner surface having a plurality of AC outlets, an illumination source, circuit breakers for each outlet, and a CO detector, and a rear surface having a power inlet for connection to an outdoor electrical generator and a set of wires to be connected to the ground of the electrical generator to turn off the generator when the CO detector detects a minimal threshold amount of CO within the residence. The power strip is applied to the lower seat of the open window frame, the window panel is then closed upon the upper surface, and adjustable sliding side panels are extended to seal the power strip within the window when the power to the building is off, after which the outdoor generator may be started and run, the power cord plugged into the generator and the power inlet, with the multiple AC outlets on the inner surface providing multiple connections to power multiple AC operated electrical devices.

14 Claims, 5 Drawing Sheets

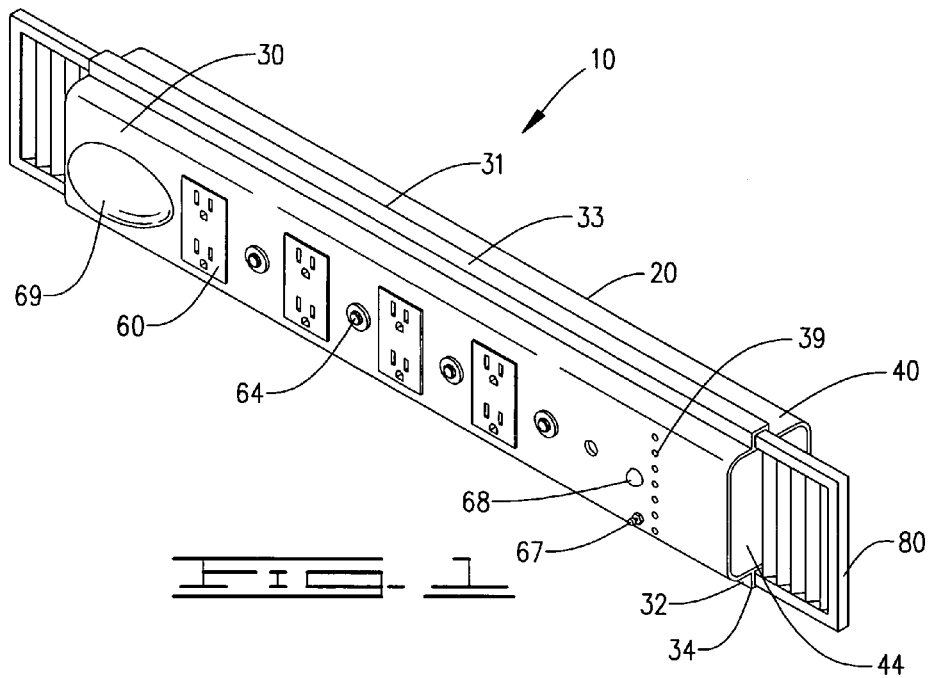
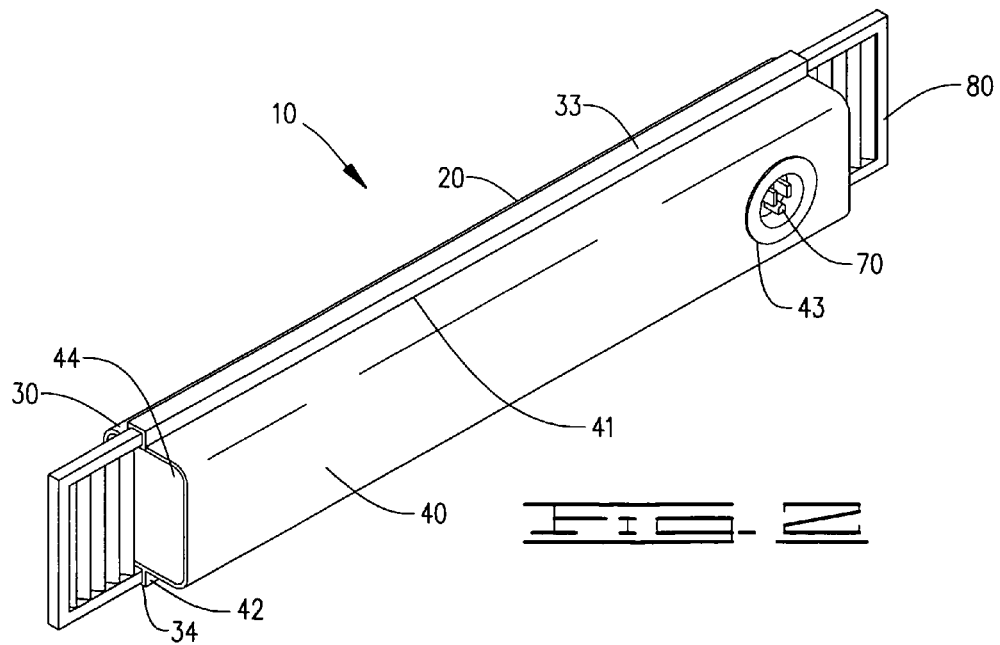

WINDOW POWER DISTRIBUTION PANEL FOR EXTERIOR GENERATOR

CROSS REFERENCE TO RELATED APPLICATIONS

None.

I. BACKGROUND OF THE INVENTION

1. Field of Invention

An outdoor generator accessory comprising a window power strip, the power strip defining an encasement having a lower margin set within a window seat of a residence or commercial building, and upper margin sealed against a lower window panel, in inner surface having a plurality of AC outlets, an illumination source, circuit breakers for each outlet, and a CO detector, and a rear surface having a power inlet for connection to an outdoor electrical generator and a set of wires to be connected to the ground of the electrical generator to turn off the generator when the CO detector detects a minimal threshold amount of CO within the residence. The power strip is applied to the lower seat of the open window frame, the window panel is then closed upon the upper surface, and adjustable sliding side panels are extended to seal the power strip within the window when the power to the building is off, after which the outdoor generator may be started and run, the power cord plugged into the generator and the power inlet, with the multiple AC outlets on the inner surface providing multiple connections to power multiple AC operated electrical devices.

2. Description of Prior Art

A preliminary review of prior art patents was conducted by the applicant which reveal prior art patents in a similar field or having similar use. However, the prior art inventions do not disclose the same or similar elements as the present window power panel for an outdoor electrical generator, nor do they present the material components in a manner contemplated or anticipated in the prior art.

A first set of patents disclose a control panel which is located on the generator itself provides a control panel which divide a control panel into three separate zones. See, U.S. Pat. Nos. 7,224,578 to Buck and 6,801,425 to Buck. The first zone defines commonly used switches, a second zone has a plurality of fuses and electrical outlets with 110 volt AC and 220 volt AC provided with a power selection switch, and a third zone has a generator throttle control with an on/off switch. This is not provided to be mounted remote from the generator, does not seal within a window seal and does not alert of provide a CO sensor which will shut off the generator in the event of a CO level occurrence. These patents address control zones and apparatus for the generator itself upon the generator itself.

An enclosure for a power cord to connect a generator power cord into a home electrical panel in the event of an emergency has a rolled cord within the enclosure to be connected to an outdoor generator in U.S. Pat. Nos. 6,369,321 to Flegel and 6,184,461 to Flegel. It is disclosed as an exterior box with a weather sel to prevent intrusion of moisture into the box when the box door is closed. It does not address the issue of providing a window mounted power distribution panel, does not mention or reference any CO monitoring feature and does not disclose any adaptation to being seated within a window providing an outdoor element seal to seal the device within a window or door, except for a seal on the panel door itself. It is merely a box with a cord to connect to an exterior generator in the event of an emergency power failure.

Two monitored control display devices are indicated in U.S. Pat. Nos. 7,053,497 to Sodemann and 4,798,082 to Fujikawa. In Sodemann, the device disclosed is an outlet connected to a portable generator indicating the load power frequency to monitor the load being applied to a portable generator to prevent a circuit overload while power is being used by the device connecting to the supply outlet on the device. In Fujikawa, the device provides a remote monitoring device attached to a remote electrical generator which monitors the state of the electrical generator by a wired connection and an adapted multi-pin plug. Neither provide any power distribution feature, nor is any power distribution feature disclosed or contemplated within the scope of these devices.

In a U.S. design Pat. No. D344,067 to Krokaugger, the drawings indicate a power distribution panel with several different connectors alleged to be provided for different electrical power plug-in cords, although none appear to be AC power cords. They may be inferred from the title, however. It is difficult to tell what is inside the casing, shown only from external views. Another U.S. design Pat. No. D546,761 to Schnackenberg states that it is a housing for a parallel connection kit for a power generator. It appears to have a 220 volt outlet, a couple of holes for 110 volt outlets, and a switch. Again it is difficult to determine what is inside the box as the drawings only indicate the outside views of the housing.

II. SUMMARY OF THE INVENTION

Outdoor generators are used by homeowners in emergency power outages and also in the construction industry to supply local power to a building or structure that has yet to be connected to public utilities. These generators are intended for outdoor use because of the exhaust gasses generated by the internal combustion engines which produce the electrical current in a voltage and amperage which operate power tools, electrical equipment, provide lighting and provide power necessary to operate the electrical systems of a residence during a power outage.

Some residences and businesses have installed an emergency backup electrical generator using a permanent installation that provides power to the electrical power panel with either a manual switch to cancel power from the public utility service and operate the electrical system of the building with the power from the electrical generator or an automatic bypass switch to instantly switch power from the utility supply to the electrical generator. The present window power distribution panel is not intended for use with this permanently installed generator system. It is intended for use with portable electrical generators which are operated only in the event of a power outage or use as a power supply to a building under construction or where there is no available electrical utility supply at the time. At the present time, the portable electrical generators are placed outside the building or dwelling and a power cord is run into the house or building through a window, door or other opening in the house or building. Depending on how far away the generator is placed from the house or building, usually determined by the length of the power supply cord, the noise produced by the generator can be an annoyance. More importantly, however, is the risk of exhaust gas intrusion into the house or building and also the exposure of the interior of the building to cold weather, moisture, heat or rain intrusion through the location where the cord is run into the house or building. It is also the case with portable generators that the cord being run into the house or dwelling only provides a single outlet operating at a single voltage to operate only one electrical device at a time, unless an outlet expander is applied to the power cord, multiple cords are attached to the electrical generator or the cord is moved from one location to another as needed.

The window power distribution panel is seated within a window frame, having an encasement that allows for the window to be close and secured, with expanding panels to be moved laterally to seal off the window opening once installed. This prevents loss of heat, loss of cool air and seals the window to prevent intrusion of moisture, humidity, outdoor pollens, rain, snow and other unwanted outdoor elements from entry through the window. It is also contemplated that this device may be supplied in an embodiment that would be suitable form placement within a sliding glass door or the frame of a window that has yet to have a window installed, although the present panel does not define elements which would reference a door of window frame.

The power cord from the outdoor electrical generator provides a generous length to place the electrical generator away from the window seat and attaches to the outdoor exposure of the encasement. A front panel, located inside the house or building provides a plurality of AC outlets for 110 and 220 volt power supply, an illumination source so that the person using the panel can see where to plug power cords into, an independent circuit breaker for each outlet to prevent overload, a CO detector to ensure that no exhaust gasses are being allowed into the house or building above a safe acceptable level, and a ground interrupt circuit wired from the CO detector through the rear panel of the encasement to the electrical generator to shut off the portable outdoor electrical generator when unacceptable levels of CO are detected within the house or the building.

III. DESCRIPTION OF THE DRAWINGS

The following drawings are submitted with this utility patent application.

FIG. 1 is a front perspective view of the power distribution panel.

FIG. 2 is a rear perspective view of the power distribution panel.

FIG. 6 is the wiring diagram for the power distribution panel.

IV. DESCRIPTION OF THE PREFERRED EMBODIMENT

Figure 3:
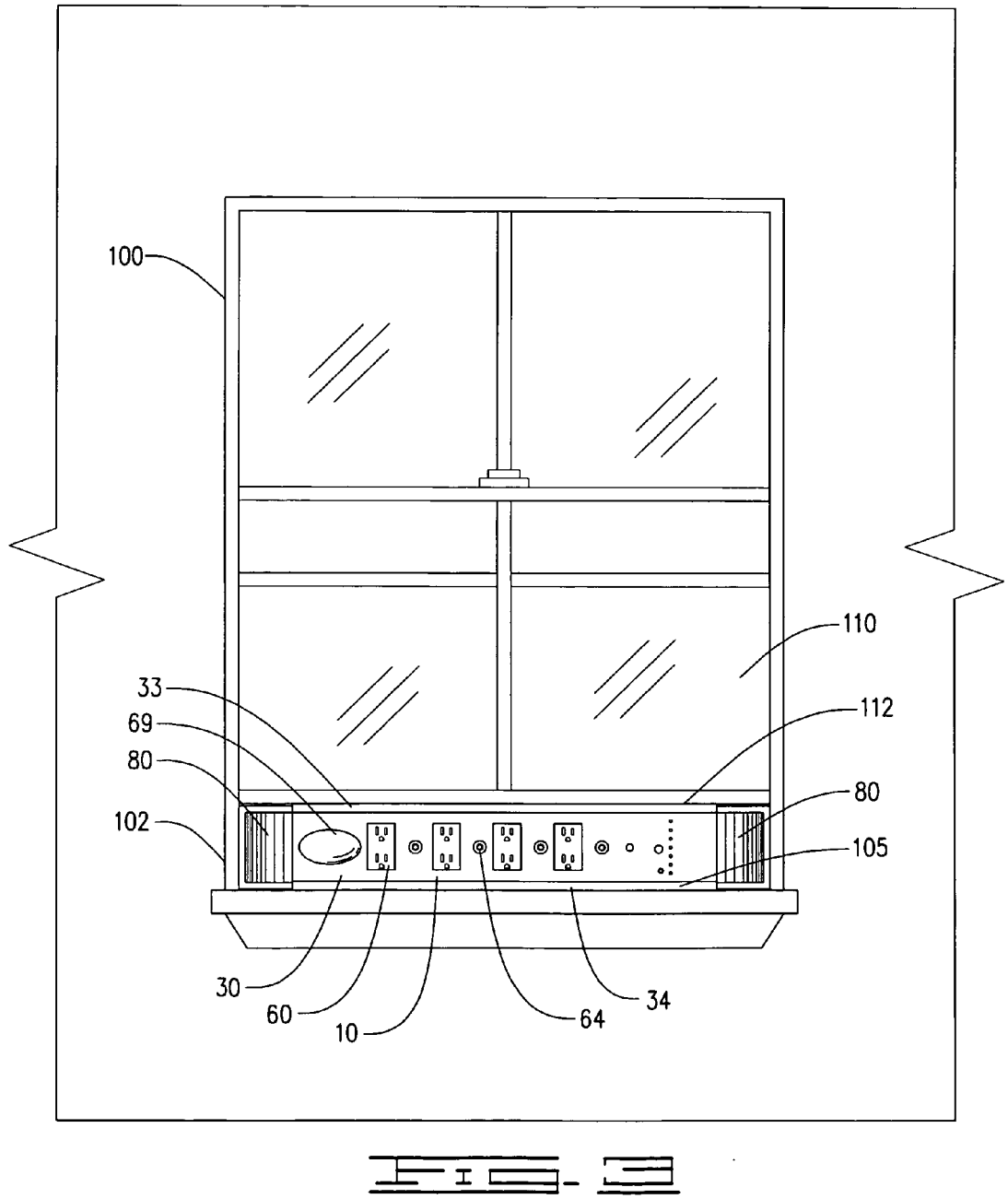
FIG. 3 is a front view of the power distribution panel installed in a window with the front panel located on the interior of the building.

A power distribution panel 10 for temporary installation within a window sill 105 or another opening between the inside and outside of a dwelling to be attached to an exterior portable electrical generator 200, the power distribution panel 10, shown in FIGS. 1-6, comprising an encasement 20 having a front panel 30 and a rear panel 40, the front and rear panels being attached together at an upper margin 31, 41 and a lower margin 32, 42 defining a transverse encasement cavity 50 which is sealed to any weather elements. The front panel 30 further defines an upper sill ridge 33 and a lower sill ridge 34, a plurality of outlet openings 35, a plurality of ground fault reset openings 36, an illumination socket 37, and at least one socket 38 adjacent to a plurality of air slots 39. The rear panel 40 provides a rear socket opening 43. The entire encasement 20 is sealed from weather elements.

Figure 4:
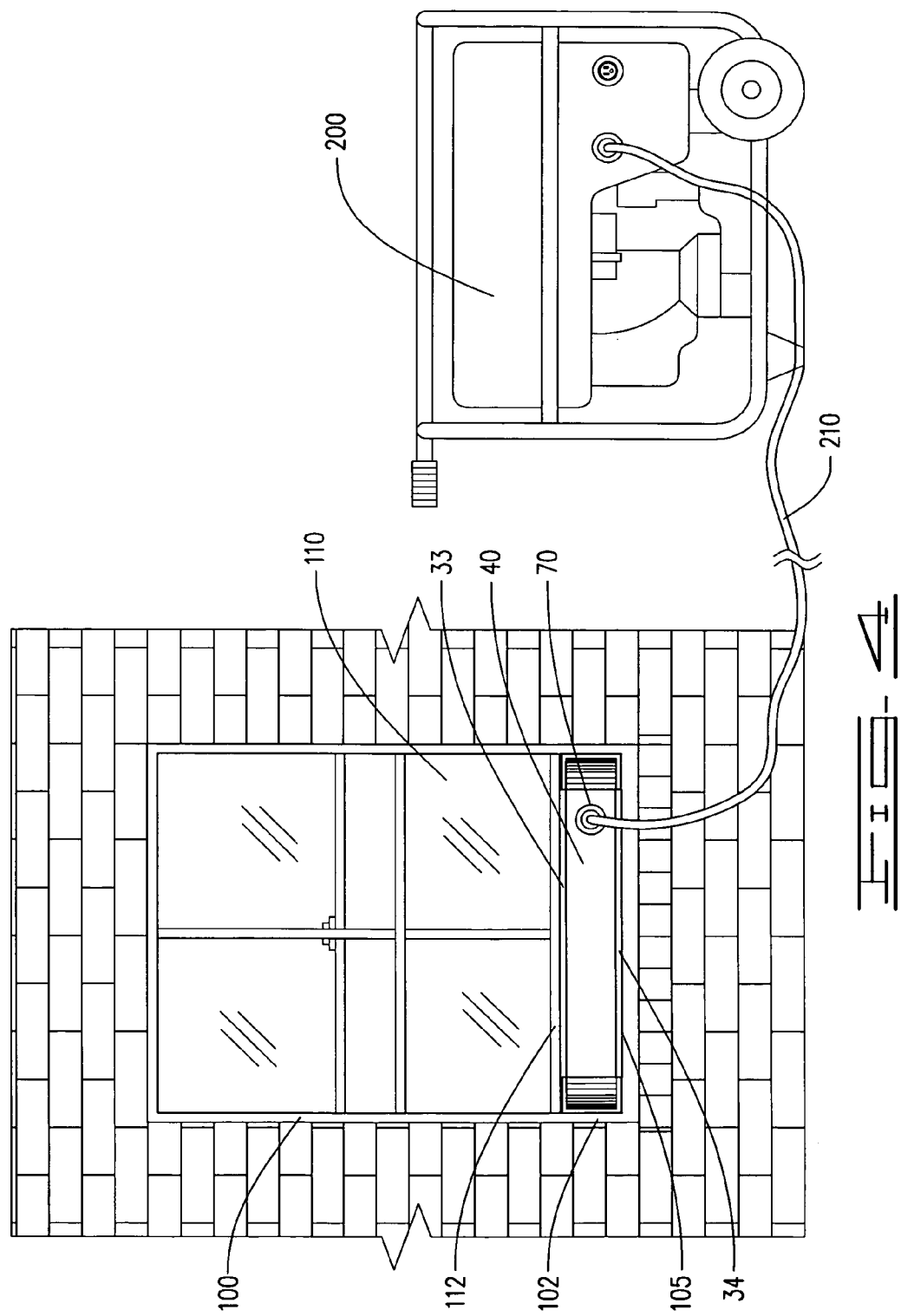
FIG. 4 is a rear view of the power distribution panel installed in the same window as disclosed in FIG. 3 with the rear panel located on the exterior of the building the power distribution panel further connected to an exterior portable electrical generator.
Figure 5:
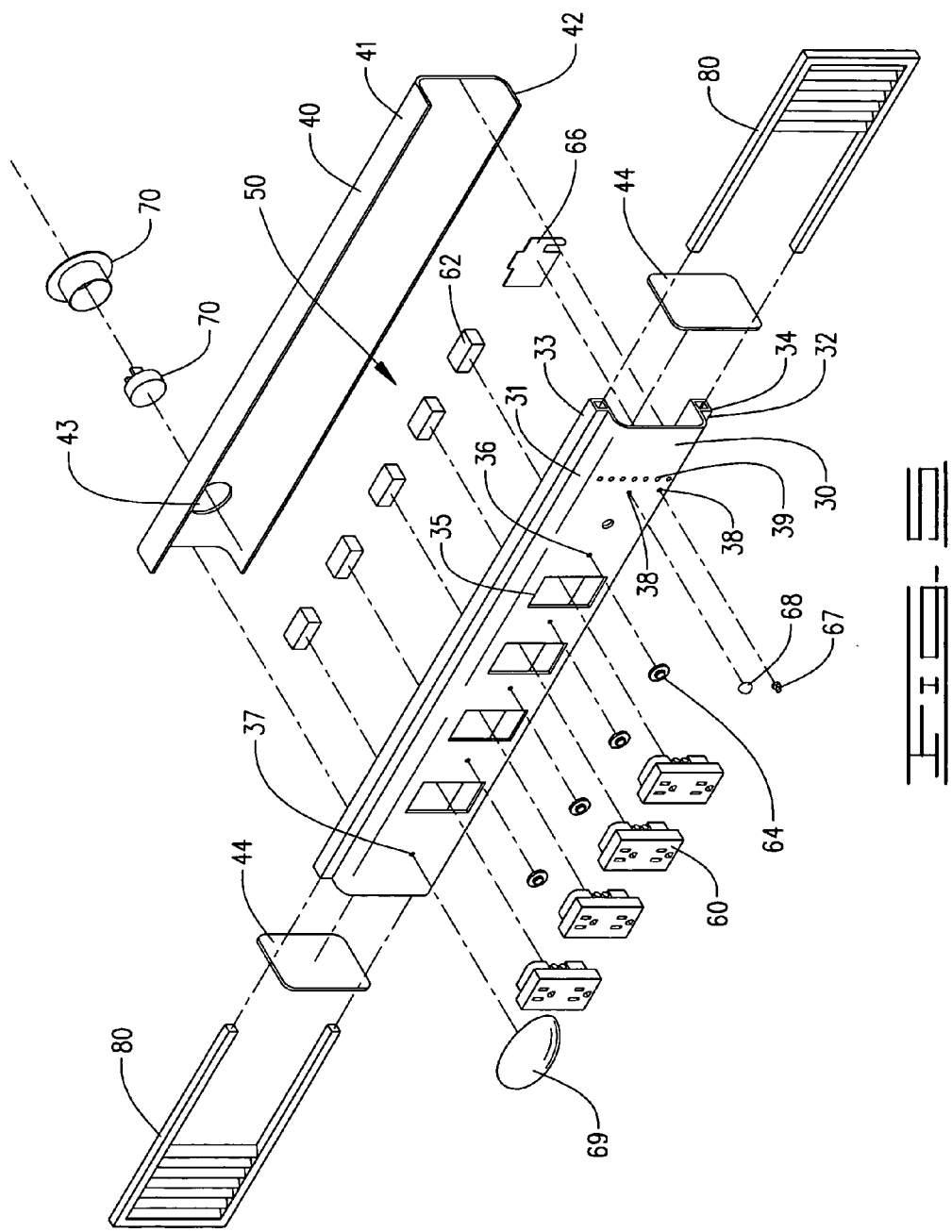
FIG. 5 is an expanded view of the power distribution panel assembly.
Figure 11:
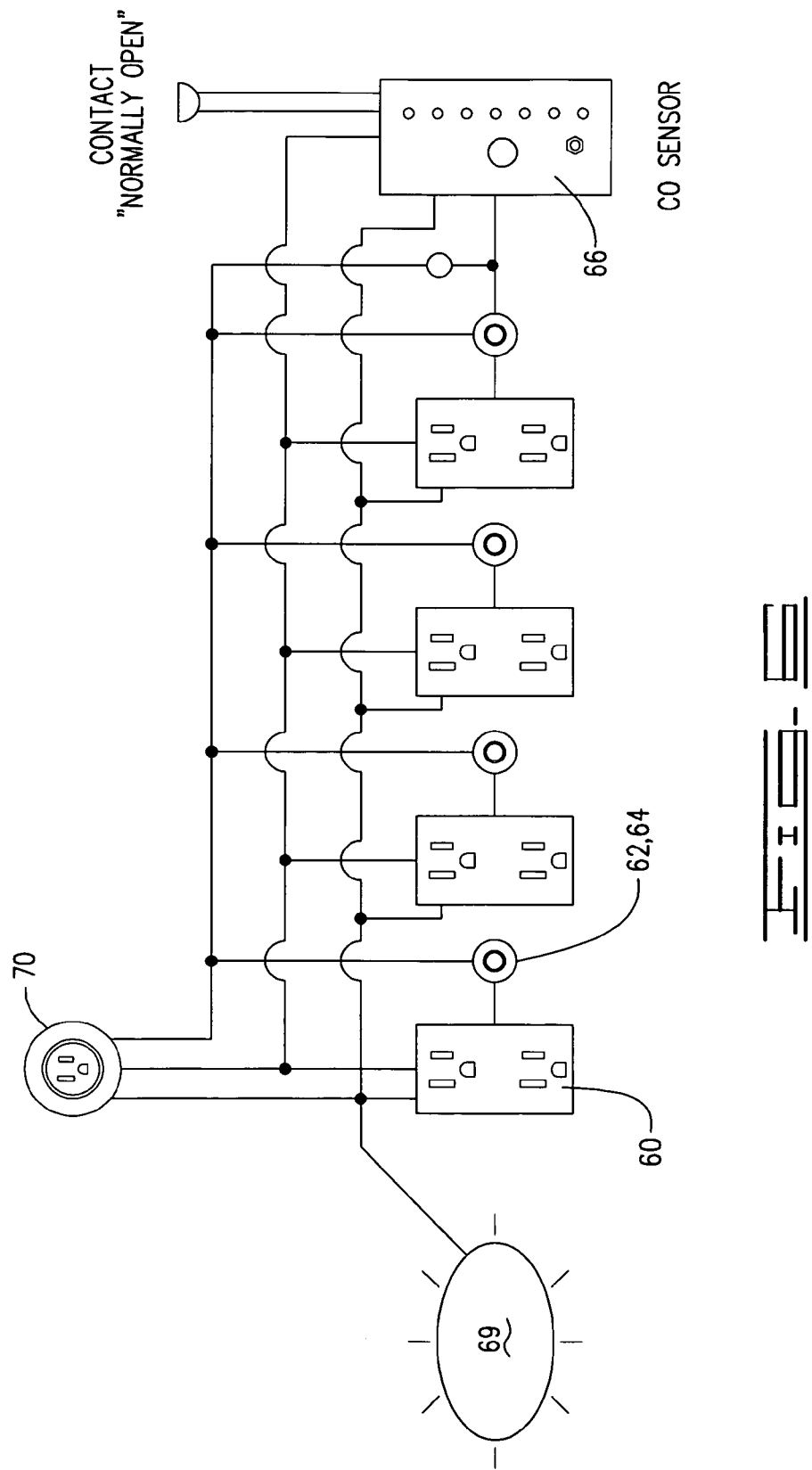

Further installed within to front panel 30 and within the encasement cavity 50, shown in FIGS. 1, 3 and 5, is an electrical outlet 60 in each of the plurality of outlet openings 35, a ground fault fuse switch 62 and ground fault reset button 64 installed within each of the plurality of ground fault reset openings 36 and attached to a corresponding electrical outlet 60, a CO sensor 66 installed behind the plurality of air slots 39, with a test button 67 to check the operational condition of the CO sensor 66 and provides an audible or visual alert when depressed to indicate the operational condition, and a sensor LED 68 indicating the presence of an excess amount of CO through the air slots 39, each test button 67 and sensor LED 68 installed within a separate socket 38, the CO sensor 66 providing a "normally open" electrical signal which changes to a closed position upon the presence of an excess amount of CO through the air slots 39, and an illumination source 69 attaching to the illumination socket 37 to provide illumination to the front panel 30 during operation. Further installed within the rear panel 40 is a rear electrical socket 70 providing a point of connection for an electrical power cord 210 further attaching to an exterior electrical power generator 200, as indicated in FIG. 4. The rear electrical socket 70 may be of a standard plug pattern or may be proprietary to prevent any under sized or under rated cord from being connected between the portable electrical generator 200 and the power distribution panel 10.

The power distribution panel 10 is provided with supporting electrical wiring attaching each component installed within the front and rear panels 30, 40, as shown in the wiring diagram of FIG. 6. In addition, the CO sensor 66 providing a "normally open" switch which defaults into a closed position upon the sensing of an excess amount of CO through the air slots may be further connected by a return wire, which could be integrated within the electrical power cord 210 to a ground switch on the exterior electrical power generator to kill the motor of the exterior electrical power generator when the CO sensor switch closes (not shown).

The power distribution panel 10 may also include end caps 44 to close off the transverse encasement cavity 50 from each side of the power distribution panel 10, to make the encasement sealed from weather and allow access into the encasement cavity without disassembly of the encasement, and adjustable side panels 80 which expand the width of the power distribution panel to completely fill the window opening when installed within a window 100 as indicated in FIGS. 3 and 4, to prevent outside air from entering the interior of the building, the adjustable side panels 80 being made of an expandable material providing some thermal transfer barrier. The power distribution panel 10 may contain all or some of the disclosed elements, with the essential disclosure being the encasement 20, the electrical outlets 35, the rear plug socket 70 and electrical power cord 210. The remainder of the disclosed components would be optional at the discretion of the market and the needs of the consumer. It is highly recommended that the power distribution panel have numerous electrical outlets to allow more than one electrical cord to be plugged into the power distribution panel during emergency operation, as only having one or two electrical outlets would be less feasible than having eight or more electrical outlets for numerous electrical appliances to be plugged in to received operational power, provided the current drawn by the electrical devices plugged into the power distribution panel does not exceed the rated output of the portable electrical generator.

It is important to note that this power distribution panel 10 is not intended for a permanent installation. It is also not intended for use where a permanently installed backup electrical generator is connected to an electrical power panel in the building or premises. It is intended for use in the situation where there has been a sudden loss of electrical power due to local power failure, storm or weather, or local blackout and where the user has an exterior electrical generator of the type operated by an internal combustion engine. It is also intended for use at any location that does not have access to an electrical supply line, but does have a window or other opening, and where the user would like to use an exterior electrical generator to provide power to the interior of the location without outside weather being introduced to the interior of the location, such as a building or home under construction or in a remote area. The power distribution panel 10 does not require installation into an opening, but it would be higher encouraged to prevent operation of the power distribution panel in an unsuitable manner.

The preferred installation of the device shown in the drawing figures would be in the bottom 102 of a vertical window 100, as indicated in FIGS. 3 and 4. The sliding window panel 110 would be opened to some extent, wherein the power distribution panel 10 is inserted into the lower window sill 105 with the front panel 30 facing interior, the rear panel 40 facing the exterior, the lower sill ridge 34 placed in the lower window sill 105 and then closing the window panel 110 to engage the lower edge 112 of the window panel upon the upper sill ridge 33, securing the power distribution panel 10 between the window panel 110 and the lower window sill 105. In the event the power distribution panel is a width identical to the width of the window, the power distribution panel should completely seal within the window. In an embodiment having the adjustable side panels 80, the power distribution panel 10 may be laterally extended to several different width windows by installing the power distribution panel between the lower edge of the window and the bottom of the window frame and then pulling the adjustable side panels outward until they fill any voids between the power distribution panels and the edges of the window frame, as indicated in FIGS. 3 and 4. The power distribution panel 10 would then be plugged into the portable electrical generator 200 by the power cord 210 attached to the rear electrical socket 70, providing electrical power to the power distribution panel 10.

While the power distribution panel has been particularly shown and described with reference to a preferred embodiment thereof, it will be understood by those skilled in the art that changes in form and detail may be made therein without departing from the spirit and scope of the invention.

What is claimed is:

1. A power distribution panel for temporary installation within a window sill or another opening between an inside and outside of a dwelling to be attached to an exterior portable electrical generator, said power distribution panel comprising:
   an encasement having a front panel and a rear panel, said front and rear panels being attached together at an upper margin and a lower margin defining a transverse encasement cavity which is sealed to any weather elements, said front panel further defining an upper sill ridge, a lower sill ridge, at least one outlet opening, at least one socket, and at least one set of air slots, and said rear panel further defining a rear socket opening;
   at least one electrical outlet installed within said at least one outlet opening;
   a CO sensor installed behind said air slots to monitor air quality at said front panel;
   a test button attached to said CO sensor installed within said at least one socket, said test button to check the operational condition of said CO sensor and provide an audible or visual alert when depressed to indicate said operation condition;
   a rear electrical socket installed within said rear socket opening of said rear panel;
   a power cord connecting said rear electrical socket to said exterior portable electrical generator; and
   electrical wiring within said encasement cavity to connect said rear electrical socket to said electrical outlet, CO sensor, and indicator LED, wherein said power distribution panel is seated within a bottom of a window with a vertically operation window panel with said lower sill ridge within a lower window sill of said window, said window panel then lowered until a bottom edge of said window panel is secured against said upper sill ridge, securing said power distribution panel within said window and providing a weather resistant seal from outside elements through said window opening.

2. The power distribution panel as disclosed in claim 1, said front panel further comprising: at least one ground fault reset opening within which a ground fault fuse switch and a ground fault reset button are installed and further attached to said at least one electrical outlet to monitor and prevent electrical overload to said at least one electrical outlet.

3. The power distribution panel as disclosed in claim 1, said front panel further comprising: a second LED socket within which a sensor LED is installed which is further connected to said CO sensor and becomes illuminated when said CO sensor detects an excess amount of CO through said air slots on said front panel.

4. The power distribution panel as disclosed in claim 1, said encasement further comprising: end caps to seal the transverse encasement cavity of the power distribution panel which may be removed to gain access into said encasement cavity without detaching the respective upper and lower margins of the front and rear panels.

5. The power distribution panel as disclosed in claim 1, said encasement further comprising: adjustable side panels which expand the horizontal profile of the power distribution panel laterally when installed within a window to further inhibit outside air from entering the interior of the building, said adjustable side panels made of an expandable material and serving as thermal transfer barrier.

6. The power distribution panel as disclosed in claim 1, said CO sensor providing a normally open electrical signal which changes to a closed position upon the presence of an excess amount of CO through the air slots.

7. The power distribution panel as disclosed in claim 1, further comprising: said front panel having at least one ground fault reset opening within which a ground fault fuse switch and a ground fault reset button are installed and further attached to said at least one electrical outlet to monitor and prevent electrical overload to said at least one electrical outlet and a second LED socket within which a sensor LED is installed which is further connected to said CO sensor and becomes illuminated when said CO sensor detects an excess amount of CO through said air slots on said front panel; said CO sensor providing a normally open electrical signal which changes to a closed position upon the presence of an excess amount of CO through the air slots.

8. A power distribution panel for temporary installation within a window sill or another opening between an inside and outside of a dwelling to be attached to an exterior portable electrical generator, said power distribution panel comprising:
   an encasement having a front panel and a rear panel, said front and rear panels being attached together at an upper margin and a lower margin defining a transverse encasement cavity which is sealed to any weather elements, said front panel further defining an upper sill ridge, a lower sill ridge, at least one outlet opening, at least one illumination socket, at least one LED socket, and at least one set of air slots, and said rear panel further defining a rear socket opening;

at least one electrical outlet installed within said encasement cavity into said at least one outlet opening;

a CO sensor installed behind said air slots to monitor air quality at said front panel and a test button attached to said CO sensor installed within said at least one socket, said test button to check the operational condition of said CO sensor and provide an audible or visual alert when depressed to indicate said operation condition;

an illumination source installed within said illumination socket to provide illumination to said front panel during operation;

a rear electrical socket installed within said rear socket opening of said rear panel;

a power cord connecting said rear electrical socket to said exterior portable electrical generator; and electrical wiring within said encasement cavity to connect said rear electrical socket to said electrical outlet, CO sensor, and indicator LED, wherein said power distribution panel is seated within a bottom of a window with a vertically operation window panel with said lower sill ridge within a lower window sill of said window, said window panel then lowered until a bottom edge of said window panel is secured against said upper sill ridge, securing said power distribution panel within said window and providing a weather resistant seal from outside elements through said window opening.

9. The power distribution panel as disclosed in claim 8, said front panel further comprising: at least one ground fault reset opening within which a ground fault fuse switch and a ground fault reset button are installed and further attached to said at least one electrical outlet to monitor and prevent electrical overload to said at least one electrical outlet.

10. The power distribution panel as disclosed in claim 8, said front panel further comprising: a second LED socket within which a sensor LED is installed which is further connected to said CO sensor and becomes illuminated when said CO sensor detects an excess amount of CO through said air slots on said front panel.

11. The power distribution panel as disclosed in claim 8, said encasement further comprising: end caps to seal the transverse encasement cavity of the power distribution panel which may be removed to gain access into said encasement cavity without detaching the respective upper and lower margins of the front and rear panels.

12. The power distribution panel as disclosed in claim 8, said encasement further comprising: adjustable side panels which expand the horizontal profile of the power distribution panel laterally when installed within a window to further inhibit outside air from entering the interior of the building, said adjustable side panels made of an expandable material and serving as thermal transfer bather.

13. The power distribution panel as disclosed in claim 8, said CO sensor providing a normally open electrical signal which changes to a closed position upon the presence of an excess amount of CO through the air slots.

14. The power distribution panel as disclosed in claim 1, further comprising: said front panel having at least one ground fault reset opening within which a ground fault fuse switch and a ground fault reset button are installed and further attached to said at least one electrical outlet to monitor and prevent electrical overload to said at least one electrical outlet and a second LED socket within which a sensor LED is installed which is further connected to said CO sensor and becomes illuminated when said CO sensor detects an excess amount of CO through said air slots on said front panel; said CO sensor providing a normally open electrical signal which changes to a closed position upon the presence of an excess amount of CO through the air slots.

* * * * *